W. FELD.
TREATMENT OF COAL GAS AND ANALOGOUS GASES FOR OBTAINING TAR AND AMMONIA.
APPLICATION FILED SEPT. 27, 1907.
951,778.
Patented Mar. 8, 1910.
3 SHEETS—SHEET 1.
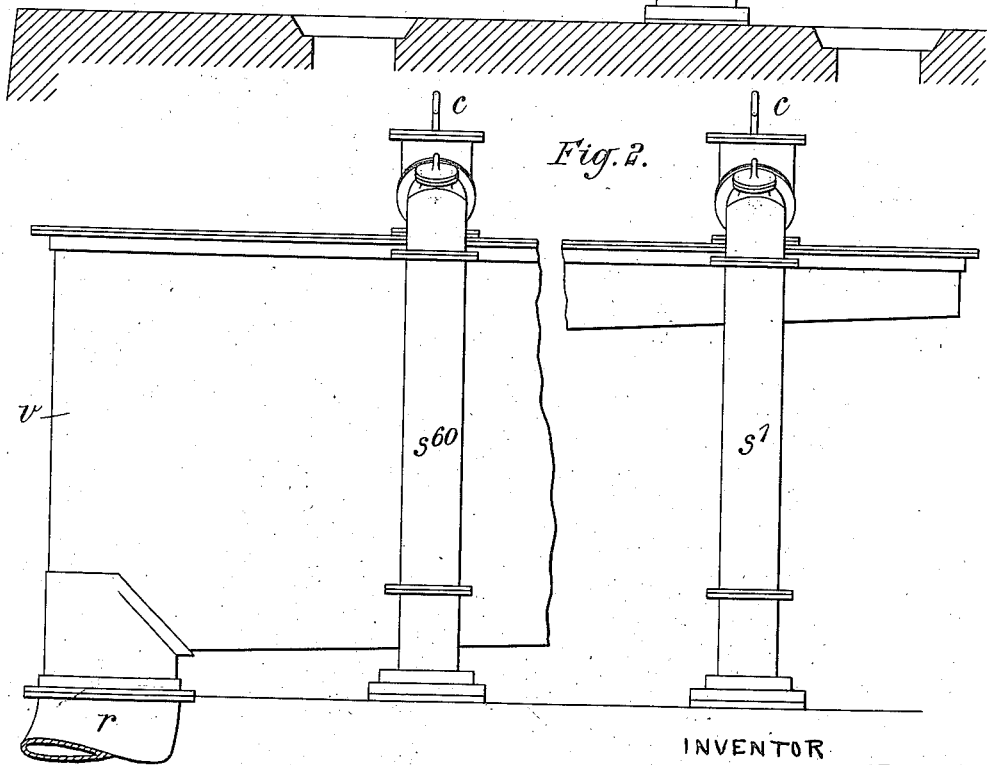

W. FELD.
TREATMENT OF COAL GAS AND ANALOGOUS GASES FOR OBTAINING TAR AND AMMONIA.
APPLICATION FILED SEPT. 27, 1907.
951,778.
Patented Mar. 8, 1910.
3 SHEETS—SHEET 2.
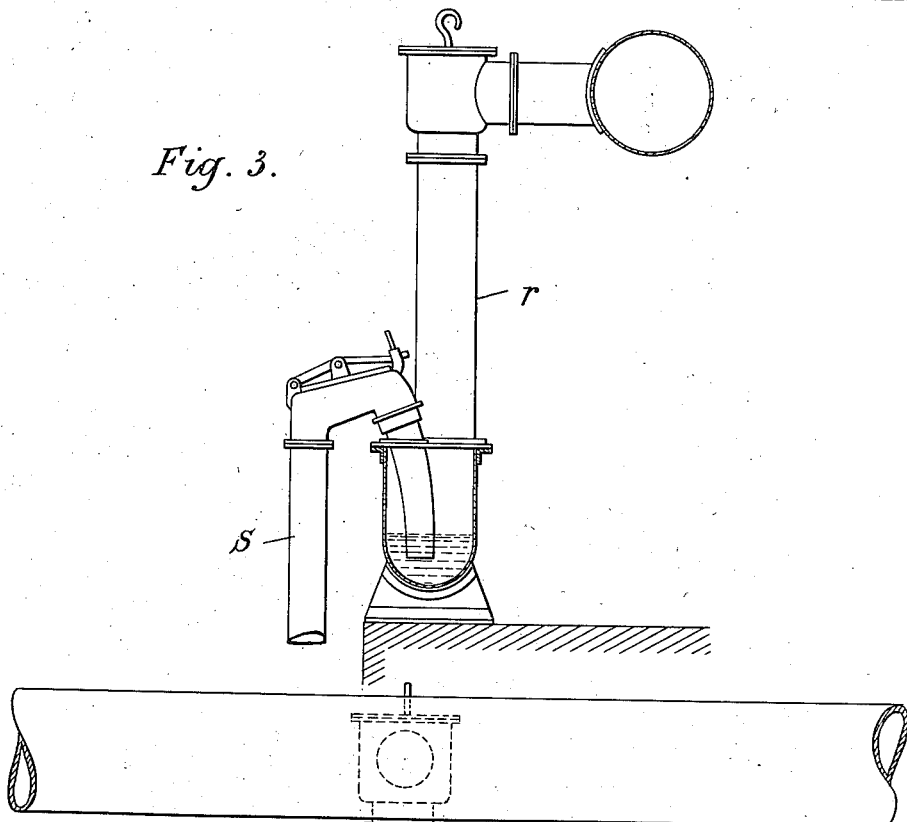
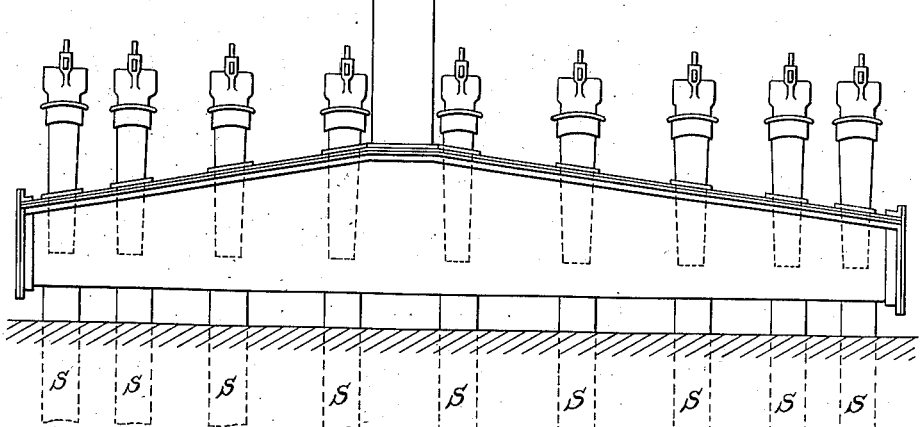
WITNESSES
L. H. Grote
M. E. Kerr
INVENTOR
Walther Feld,
By Howson and Howson
Attorneys

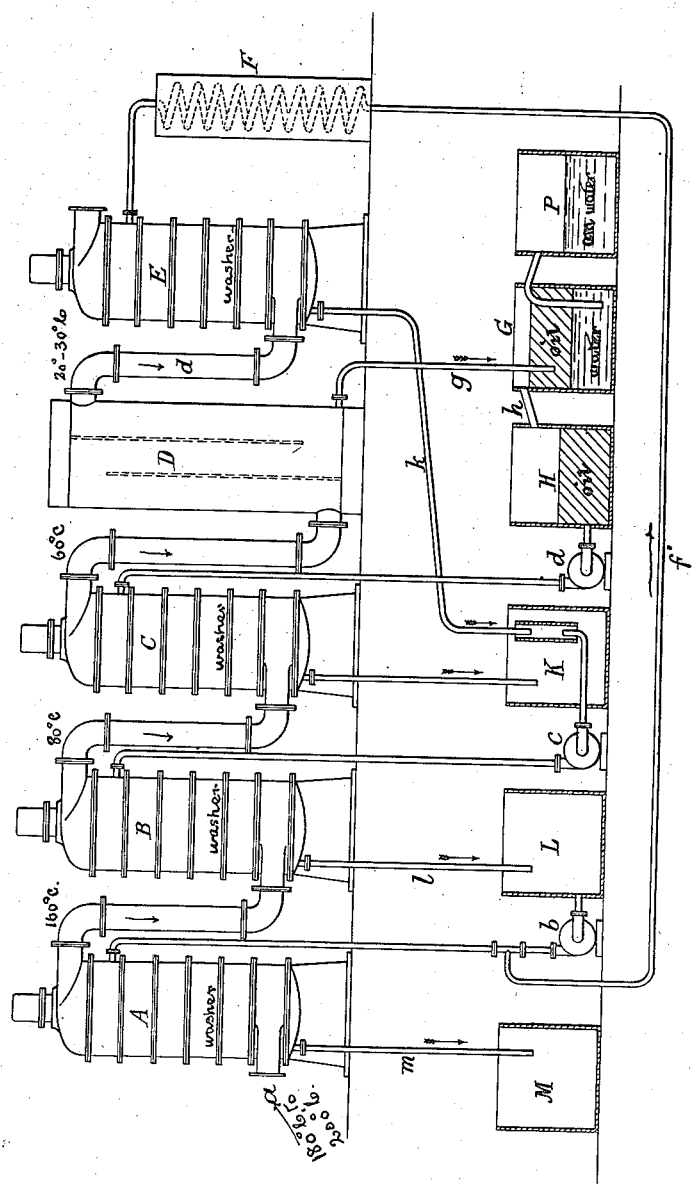

UNITED STATES PATENT OFFICE.

WALTHER FELD, OF HÖNNINGEN-ON-THE-RHINE, GERMANY.

TREATMENT OF COAL-GAS AND ANALOGOUS GASES FOR OBTAINING TAR AND AMMONIA.

951,778.     Specification of Letters Patent.     Patented Mar. 8, 1910.

Application filed September 27, 1907. Serial No. 394,865.

*To all whom it may concern:*

Be it known that I, WALTHER FELD, a subject of the King of Prussia and the German Emperor, residing at Hönningen-on-the-Rhine, in the Kingdom of Prussia and German Empire, have invented new and useful Improvements in the Treatment of Coal-Gas and Analogous Gases for the Obtainment of Extraneous Matters such as Tar Constituents and Ammonia Therefrom, of which the following is a specification.

My invention has for its object to effect the obtainment of extraneous matters (such for example as tar constituents, cyanogen, ammonia, and the like) from coal-gas and analogous gases in a more economical and efficient manner than hitherto.

Hitherto tar has been separated from coal gases and the like by cooling them to a low temperature, or, as described in the specification of British Letters Patent No. 26,262 A. D. 1905 granted to me, by washing such gases with the separated tar itself and in order to split the tar, produced in either of these ways, into its constituents, it has been distilled in vessels heated by an open fire, or by steam and the products of distillation, such as benzole and its homologues, water, ammonia, and the various tar oils, were separated from one another by fractional distillation. As a rule, the oils, obtained by tar distillation according to their various boiling points, are classified as follows:— Light oils with a boiling point up to about 170° centigrade, creosote oils with a boiling point from about 170° to about 230° centigrade, heavy tar oils with a boiling point from about 230° to about 270° centigrade, anthracene oils with a boiling point from about 270° to about 320° centigrade.

The matters remaining in the distilling vessel, and consisting of a mixture of carbon with hydrocarbons of a boiling point about 320° and above centigrade, are classified as "pitch." Vapors of such solids and liquids as can be evaporated above, at different temperatures, different tensions, the tension being higher the nearer such product is heated to its boiling point. According to this tension, any gas being in contact with such matter will contain, at a certain temperature, a corresponding amount of vapor, which amount is the higher in proportion to the higher temperature of the gas. A gas in such condition is said to be saturated with the vapor of the given substance. If such saturated gas of a given temperature B be cooled down to a lower temperature A, so much of the vapors must condense, or separate from the gas, as corresponds to the difference between the tension of such vapors at the former temperature B and at the lower temperature A. If, on the other hand, a gas in such saturated condition, at a temperature B, be heated to a higher temperature C, without being in contact with the vaporizable substance, the gas, at the temperature C, will not be saturated with the vapors, and vice versa, such gas being cooled down to under the temperature C, no condensation, or separation, of the vapors can occur until, the gas is cooled below the temperature B. The temperature B is the dew point of the gas with reference to the given substance; that is to say, as long as the gas is not cooled to under the dew point B, no transformation of the vapors in question into liquid, or solid, form, and therefore no separation, can occur. Coal-gases and similar gases, at the temperature at which they leave the ovens, or retorts, are in this unsaturated condition as regards most of the constituents of such gases. The dew points of such gases, for their different constituents, are at different, gradually decreasing, temperatures according to the amounts thereof present and their boiling point. According to one of the features of my invention I utilize this property so that the heat of the gases themselves is employed to effect the required separation of the desired constituents therefrom by a system of fractional coolings, or of fractional coolings combined with successive washings.

I have found that, commonly, the dew points of ordinary coal-gas for most of its tar constituents of high boiling points lie below 200° centigrade, that is to say, so long as such gases are not cooled below 200° centigrade no such constituents will be condensed, and of course, if the dew point of such gas for water be 75° centigrade, no water will be condensed until the gas is cooled below that temperature. As a rule, the pipes, or passages, which lead from the ovens, or retorts, to the condensing plant are at present arranged in such a way that the portion of the gases which comes into contact with the inner walls of such pipes, or passages, is locally cooled, not only below the dew point of the said tar constituents, but even below the dew point of water, and consequently, gas constituents are condensed on the inner walls of such pipes, or passages, while the remainder of the gases passing through the middle of such pipes, or passages, may have a temperature far above 200° centigrade, and these hot gases coming into contact with the said condensed products decompose them, precipitating carbon and giving off hydrocarbons which have a lower percentage of carbon. Such carbon and hydrocarbon is carried off with the gas and this is one of the causes of free carbon (soot) in the gases and therefore of the formation of tar, and clogging of the pipes, or passages, with carbon. According to a further feature of my invention I may precede the treatment by fractional coolings, or fractional coolings and successive washings, by preventing, as far as possible, the formation of tar itself, (that is to say, a mixture of hydrocarbon with free carbon, or soot), in order to obtain, free of carbon, tar constituents of higher boiling points, before the gases enter the first cooler, or washer, but this invention is capable of use also in cases where constituents of lower boiling points only are required to be separated in which case this prevention of the formation of tar itself need not be employed.

In cases where the deposit of carbon and consequent formation of tar in the gases as they come from the retorts, or ovens, is to be prevented, I can effect this by maintaining the heat of the said gases above, or preventing their cooling to the dew point of the said gases for their constituents of the highest boiling point. This may be done in various ways; for example, by covering the pipes, or passages, which lead from the ovens, or retorts, to the first vessel, or washer, (used in the process of separation by fractional coolings, or fractional coolings and successive washings) with a non-conductor, or bad conductor, of heat, or by applying heat to the exterior of the said pipes, or passages, or by gradually increasing the sectional area of the pipes, or passages, according to the number of ovens, or retorts, which are in communication therewith; or by introducing suitable diluting gases, steam, or other vapor, (superheated, or not,) into the retorts, or ovens, or the passage therefrom, with the object of increasing the volume of the gases containing the tar constituents; or by two, or more, such means used in combination. The gases after passing from the said pipes, or passages, can be conducted, for treatment according to my invention, into any suitable vessels adapted to effect the fractional coolings, or fractional coolings and successive washings at successively lower temperatures, so that various gas constituents are separated from each other by employing the temperature of the gases themselves without the necessity for the hitherto commonly practiced plan of employing extraneous heat for distilling the constituents from each other, after previous cooling.

The treatment by fractional coolings, or fractional coolings and successive washings, can be applied to the recovery of any, or all, of the constituents to be recovered from the gases, for instance it can be applied (in cases where the formation of tar has been prevented as aforesaid) in two, or more, vessels, for the recovery of tar constituents of the higher boiling points at successively lower temperatures, in such a way that the temperature in the second, or last, vessel is higher than the dew point of the gases for water, or (without the previous prevention of the formation of tar) the water and tar constituents of lower boiling point can be separated from the gases in two, or more, vessels, by successive coolings, or coolings and washings; and generally the treatment can be applied in a number of successive stages to obtain all, or any desired number, of the constituents, or extraneous matters, from the gases.

When, according to this invention, it is required to separate, or absorb, a constituent, or constituents, in a pure, or practically pure, condition; the volume of the gases may be increased in order to raise the gases above the dew point of any undesired constituent, or constituents, so that the desired constituent, or constituents, is or are, deposited, or absorbed, free, or practically free, from any undesired constituent. This increase of volume can be effected in various ways, such as according to the methods described, in the specification of my British applications for Letters Patents Nos. 27,567, 27,568 and 28,390 A. D. 1907, for example by adding gases, or vapors, (heated or not) which contain none, or less, of the undesired constituent, or constituents, or by slightly heating the crude gases.

In the process according to the present invention the cooling of the gases at one stage may be effected by washing them with a product, or products, of a further stage, or further stages, the said product, or products, being, or containing, a liquid with which the gases, at the given temperature, are not saturated, in order to lower the temperature of the gases by evaporation of the said liquid, and generally by cooling the gases at one stage by washing them with a liquid, or liquids, derived from a further stage, or further stages, of the process. These liquids may be derived from the gases themselves, or from other source and may be used heated, or not, according to their nature and to the special conditions.

I will now describe how my invention can be carried out, presuming, for example that the process is to include the preliminary prevention of the formation of tar.

In the accompanying drawings in which are illustrated suitable means for conveying the gas from the ovens to the recovering apparatus, Figure 1 is a sectional elevation of a dry conveyer main; Fig. 2 is a broken side elevation thereof at right angles to Fig. 1; Fig. 3 is a sectional elevation of a hydraulic conveyer main; and Fig. 4 is a side elevation at right angles thereto. Fig. 5 is a diagrammatic elevation partly in section, of a suitable apparatus for carrying out my process.

To prevent the ascension pipes becoming clogged with carbon, they at present have a diameter which is, in most cases, too wide for the amount of gases which passes through them. If they have a smaller diameter, the ascending gases pass through them at a higher speed and consequently are less exposed to the cooling influence of the walls of the pipes, or passages. For the same reason, the pipes, or passages, which lead the gases from the ascension pipes to the cooling and washing apparatus should have a gradual increase in their sectional area, which increase is in accordance with the number of ovens, or retorts, in communication with them.

Figs. 1 and 2 of the accompanying drawing show, in transverse section and side elevation respectively the two end portions of a so-called "dry main". The pipe $r$ leading from the main to the first apparatus is fixed at the end $v$ of the main. The sectional area of the main, which may be supposed to be in communication with sixty ovens, is gradually increased from the part where the first ascension pipe $s^1$ enters up to the part where the last ascension pipe $s$ enters. The communication between the main and the retorts, or ovens, may be shut off by the valves $c$.

Figs. 3 and 4 show in transverse section and side elevation respectively, a hydraulic main with the ends of the ascension pipes dipping into the liquid in the main. The pipe $r$ leading from the main to the first apparatus is fixed in the middle of the main, and therefore the sectional area of the main is increased gradually from both ends to the middle. If these arrangements be not sufficient to maintain the heat they may be supplemented or substituted by any suitable expedients for this purpose. The gases coming from the retorts and containing the tar products and water in the form of vapor, are thus led to the separation apparatus (Fig. 5). This apparatus in the form shown, to which however, I do not confine myself, comprises gas washers A, B, C and E, preferably of the vertical type described in my Patent 829,261.

D is a cooling tower for the gases, while F is a cooler for cooling water or oils.

G, H, K, L and M are tanks and $b$, $c$, $d$ liquid pumps.

The gas enters at $a$ the first washer A at a temperature from 180° C. to 200° C., or above. The dew point of the gases for those tar constituents having a boiling point of 300° C. or higher may be say 160° C. The gas must therefore be cooled to this temperature, and while this may be accomplished in any desired way, I prefer to wash the gases with the liquor condensed at a lower temperature (as will be hereinafter explained) in the second washer B. This liquor is forced to the washer A from the tank L by the pump $b$. So much of the tar constituents with a boiling point above 300° C. will be separated as are contained in the gases above the quantity which corresponds to the point of saturation and will run off through the pipe $m$, to the tank M, being in a liquid state, and will become solid at a temperature of approximately 70° C. according to the amount of free carbon and such hydrocarbons as are solid at ordinary temperatures. Such tar oils having boiling points under 300° C. as are contained in the washing liquor drawn from the tank L, are evaporated (thereby cooling the gas in the washer A) and pass with the cooled gas to the second washer B.

The gas coming from the first washer is practically free from free carbon and tar and contains practically all the gas constituents with a lower boiling point than 300° C., and besides this contains such of the tar constituents with a higher boiling point than 300° C. as corresponds to the tension of these substances at 160° C. In the second washer B, gas constituents the dew points for which are from 160° C. down to the lowest dew point next above the dew point of the gas for water, (say, in the given case, above 60° centigrade, the dew point for water being 75° centigrade) will be separated. In order to effect the separation, the gas is cooled from 160° centigrade to, say, 80° centigrade in a similar manner viz., by washing the gases with the products of condensation from the third washer C. The lowest boiling point of the product running off from the washer may be 180° centigrade. Besides products with a boiling point from 180° centigrade to 300° centigrade, this product will contain so much of the products with a boiling point above 300° centigrade as corresponds with the falling of the tension of the gas for the products with a higher boiling point than 300° centigrade. It is for the purpose of getting these products of a boiling point above 300° centigrade, as much as possible separated from those with a lower boiling point, that I use as much of the liquor coming from the second washer as the washing liquor for the first washer as is possible without lowering the temperature in the first washer to under 160° centigrade. If this liquor enters the first washer, there will be a strong evaporation of those constituents with a lower boiling point than 300° centigrade, with which the gases are not saturated at 200° centigrade, whereas the constituents with a boiling point of 300° centigrade and above, with which the gases are saturated at 160° centigrade, cannot be evaporated. This has proved to be the best means to cool the gases, a means which at the same time allows a further splitting of the gas constituents than would be possible by simply gradually cooling. Thus a greater amount of products of a boiling point above 300° centigrade will leave the first apparatus, whereas the final product of the second apparatus contains less of these products of higher boiling point. It will be understood however that the washing liquor need not have been drawn from this source, for the successful operation of my process.

The cooling in the third washer C, to say 60° C. is effected by tar products from the cooling tower D, in which tower D the gases are cooled, by water, to under the dew-point of steam in the gas, say down to 20° or 30° centigrade. The bulk of the steam in the gases and part of the light oils are condensed and the liquids are both run off from the tower by the pipe and are stored in the tank G, in which the light oils separate from the water owing to their different specific gravity. The oil being lighter than the water runs by the overflow $h$ into the tank H, whence part of it is pumped by the pump $d$ up to the washer C. The water flows by the siphon $f$ into the water tank P. This water contains ammonia which can be distilled off.

The gas coming from the tower D is saturated with light oils, and in order to extract the said oils from the gas, it passes by the pipe $d$ to, and is washed in the washer E with heavy tar oils pumped from the tank L, through the pipe $f'$ and cooled in the cooler F, before they enter the washer E. The heavy tar oils act in the washer E as a solvent for light tar oils and run off from the washer through the pipe $k$ into tank K, from which they are again pumped up to the washer B. Here the light oils are evaporated and the heavy tar oils, together with those condensed in the washer B run into the tank L by the pipe $l$. The light tar oils, evaporated in the washer B will be again condensed in the tower D. By the constant circulation of the different tar products, their quantity will be increased by those condensed from the gases passing through the washers and the surplus is run off from the respective tanks and can be sold, or used for any desired purpose.

It will be readily understood that the number of washers may be varied to get any desired gradation of tar constituents, and that the temperatures of the washers may be varied as desired. Thus, instead of starting with a temperature of 200° centigrade, or above, the first washing, or state of the process, may be effected at a temperature below the dew point of water if only the lower boiling gas constituents are required to be separated from the tarry matters. If the gases contain ammonia, the water condensed will absorb part of this. In this case the method described in my aforesaid former specification of British Letters Patent No. 26262/05 may be used to reconduct the ammonia into the gas to be separated afterward. Also any other convenient method for the extraction of ammonia, cyanogen, and other extraneous matter, may be used. If such extraction be effected in such a way that the gas is at the same time cooled, the extracted substance will be contaminated with tar oils, but contamination of the desired constituent by an undesired constituent can be prevented as aforesaid if the volume of the gas be increased above the dew point of the undesired constituent so that it is not separated. This can be effected by using a washing material (in which ammonia, or any other extraneous substance, may be absorbed) with a higher temperature than the temperature of the gases themselves. If for example the absorbing agent be dissolved in water, the hot water (even though it be but to a small amount) will raise the heat of the gases and thus the now unsaturated gases, will evaporate water and the volume of the gases will thus be raised above the dew point of the undesired constituent.

If the special conditions would not allow of preventing the formation of tar, I may first separate the tar and then separate those tar oils and other gas constituents from the gases, which, according to the temperature at the first stage, are not present in such quantities that the gases are saturated with them.

I claim as my invention:

1. In the process of extracting separately the various constituents of hot coal or analogous gas, the recovery from said gas of the vaporized tar constituents separately from each other by leading said gas from the oven or retort in which it is produced to a cooling apparatus at a temperature above that of condensation of the tar constituent having the highest dew point, cooling said gas in successive steps to the successive dew points of the various desired tar constituents of the gas and recovering said tar constituents separately as they successively condense, substantially as described.

2. In the process of extracting separately the various constituents of hot coal or analogous gas, the recovery from said gas of the vaporized tar constituents separately from each other by leading said gas from the oven or retort in which it is produced to a cooling apparatus at a temperature above that of condensation of the tar constituent having the highest dew point, cooling said gas in successive steps to the successive dew points of the various desired tar constituents of the gas, washing said gas at said successive steps and recovering said tar constituents separately as they successively condense, substantially as described.

3. In the process of extracting separately the various constituents of hot coal or analogous gas, the recovery from said gas of the vaporized tar constituents separately from each other by leading said gas from the oven or retort in which it is produced to a cooling apparatus at a temperature above that of condensation of the tar constituent having the highest dew point, leading said gas through a plurality of chambers therein, cooling said gas in said successive chambers to the successive dew points of the various tar constituents of the gas and recovering the latter separately as they successively condense, substantially as described.

4. In the process of extracting separately the various constituents of hot coal or analogous gas, the recovery from said gas of the vaporized tar constituents separately from each other by leading said gas from the oven or retort in which it is produced to a cooling apparatus at a temperature above that of condensation of the tar constituent having the highest dew point, leading said gas through a plurality of washing chambers therein, cooling and washing said gas in said successive chambers at the successive dew points of the various tar constituents of the gas and recovering the latter separately as they successively condense, substantially as described.

5. The process of extracting separately the various vaporized constituents of hot coal or analogous gas, which consists in leading said gas from the oven or retort in which it is produced to a cooling apparatus at a temperature above the dew point of the desired constituents, cooling said gas in successive steps to the successive dew points of the various constituents, increasing the volume of the gas under treatment at any desired step in the process to raise the gases above the dew point of an undesired constituent and recovering the desired constituents as they successively condense.

6. The process of extracting separately the various vaporized constituents of hot coal or analogous gas, which consists in leading said gas from the oven or retort in which it is produced to a cooling apparatus at a temperature above the dew point of the desired constituents, cooling said gas in successive steps to the successive dew points of the various constituents, increasing the volume of the gas under treatment at any desired step in the process by adding a quantity of a gas capable of absorbing an undesired constituent so as to lower the dew point of the gas under treatment with respect to the undesired constituent, and recovering the desired constituents as they successively condense.

7. The process of extracting separately the various vaporized constituents of hot coal or analogous gas, which consists in leading said gas from the oven or retort in which it is produced to a cooling apparatus at a temperature above the dew point of the desired constituents, cooling said gas in successive steps to the successive dew points of the various constituents, increasing the volume of the gas under treatment at any desired step in the process by adding a quantity of a vapor capable of absorbing an undesired constituent so as to lower the dew point of the gas under treatment with respect to the undesired constituent, and recovering the desired constituents as they successively condense.

8. The process of extracting separately the various vaporized constituents of hot coal or analogous gas, which consists in leading said gas from the oven or retort in which it is produced to a cooling apparatus at a temperature above the dew point of the desired constituents, leading said gas through a plurality of chambers therein, cooling said gas in successive steps to the dew points of the various desired constituents while maintaining the gas above its dew point for water in said successive steps, in successive chambers therein, and recovering the various constitutents of the gas as they successively condense.

9. The process of extracting separately the various vaporized constituents of hot coal or analogous gas, which consists in leading said gas from the oven or retort in which it is produced to a cooling apparatus at a temperature above the dew point of the desired constituents, leading said gas through a plurality of washing chambers therein, cooling said gas in successive steps to the dew points of the various desired constituents while maintaining the gas above its dew point for water in said successive steps therein, and recovering the various constituents as they successively condense.

10. The process of extracting separately the various vaporized constituents of hot coal or analogous gas, which consists in leading said gas from the oven or retort in which it is produced to a cooling apparatus at a temperature above the dew point of the desired constituents, cooling the same in successive steps to the successive dew points of the various constituents by washing the same at one stage with a liquid of another stage, the said liquid containing matter with which the gas at the given temperature is not saturated, whereby the temperature of the gas is lowered by the evaporation of such matter, and recovering the various constituents of the gas as they successively condense.

11. The process of extracting separately the various vaporized constituents of hot coal or analogous gas, which consists in leading said gas from the oven or retort in which it is produced to a cooling apparatus at a temperature above the dew point of the desired constituents, cooling the same in successive steps to the successive dew points of the various constituents by washing the same at one stage with a liquid of another stage, the said liquid being at a lower temperature than the gas treated therewith, and recovering the various constituents of the gas as they successively condense.

12. The process of extracting separately the various vaporized constituents of hot coal or analogous gas, which consists in leading the gas as it comes from its generator to the treating apparatus at a temperature above the dew point of the gas for its constituents of the highest boiling point, cooling said gas in successive steps to the successive dew points of the various constituents, and recovering the latter as they successively condense.

13. The process of extracting separately the various vaporized constituents of hot coal or analogous gas, which consists in leading the gas through a conduit from its generator to the treating apparatus, treating said conduit to maintain the temperature of the gas above its dew point for its constituents of the highest boiling point, cooling said gas in successive steps to the successive dew points of the various constituents, and recovering the latter as they successively condense.

14. The process of extracting separately the various vaporized constituents of hot coal or analogous gas, which consists in leading said gas in a single stream of increasing volume from a plurality of generators to the treating apparatus at a practically uniform pressure and speed, cooling said gas in successive steps to the successive dew points of the various constituents and recovering the latter as they successively condense.

15. The process of extracting separately the various vaporized constituents of hot coal or analogous gas, which consists in leading said gas from the oven or retort in which it is produced to a cooling apparatus at a temperature above the dew point of the desired constituents, diluting said gas to increase its volume before it reaches the treating apparatus, cooling said gas in successive steps in the latter to the successive dew points of the various constituents, and recovering the latter as they successively condense.

16. The process of extracting separately the various vaporized constituents of hot coal or analogous gas, which consists in leading said gas from the oven or retort in which it is produced to a cooling apparatus at a temperature above the dew point of the desired constituents, cooling the same in successive steps to the successive dew points of the various constituents, recovering the latter as they successively condense and washing the gas at a lowered temperature with a product of a former stage whereby a constituent of lower boiling point is dissolved by a constituent of higher boiling point, substantially as described.

In testimony whereof I have signed my name to this specification in the presence of two subscribing witnesses.

WALTHER FELD.

Witnesses:
GILBERT FLETCHER TYSON,
WILLIAM GERALD REYNOLDS.